United States Patent [19]
Novak

[11] 3,820,273
[45] June 28, 1974

[54] FLY AND INSECT TRAP

[76] Inventor: John Novak, 16 Beverly Blvd., Hobart, Ind. 46342

[22] Filed: Sept. 24, 1973

[21] Appl. No.: 400,248

[52] U.S. Cl. .................................. 43/113, 43/122
[51] Int. Cl. ........................................... A01m 1/04
[58] Field of Search ...................... 43/113, 107, 122

[56] References Cited
UNITED STATES PATENTS

| | | | |
|---|---|---|---|
| 1,247,724 | 11/1917 | Sassenhoff | 43/107 |
| 1,505,651 | 8/1924 | Loeschen | 43/113 |
| 1,723,919 | 8/1929 | Bykowy | 43/107 |
| 2,577,436 | 12/1951 | Smith | 43/113 |

*Primary Examiner*—Robert Peshock
*Assistant Examiner*—Daniel J. Leach

[57] ABSTRACT

A fly and insect trap having a cylindrical body with a conical cover closing the top of the body and a conical bottom closing the bottom of the body and having an opening through the apex portion of the bottom, the body defining between the interior surfaces of the cover and bottom a trap chamber for trapping the flies and insects therein, the cover adapted to receive poisoned bait or the like suspended from the apex portion thereof, with the entire trap intended to be suspended from the cover by a chain or the like in the desired location. The cover and bottom are detachably attached to the body so that they may be completely separated therefrom for ease of cleaning and the like. Further, rather than using a poisoned bait or the like there is provided an electric light to be suspended interiorly of the cover which serves to attract the flies and insects thereto in the well known manner, the cord of the lamp passing through the cover to be used for suspending the trap in the desired location.

8 Claims, 5 Drawing Figures

PATENTED JUN 28 1974 3,820,273
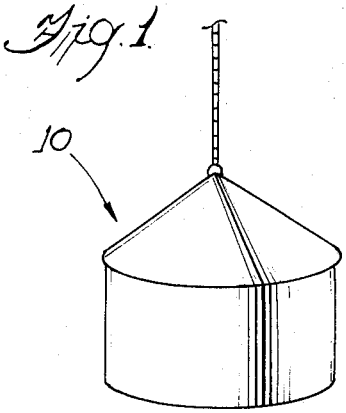
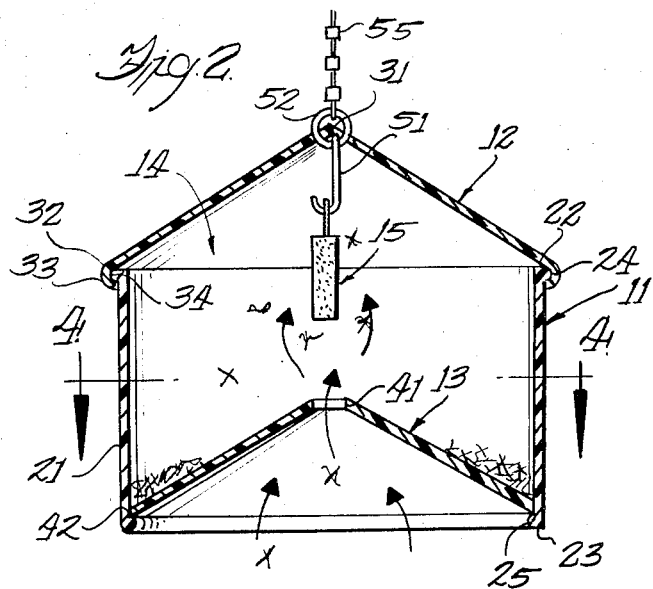
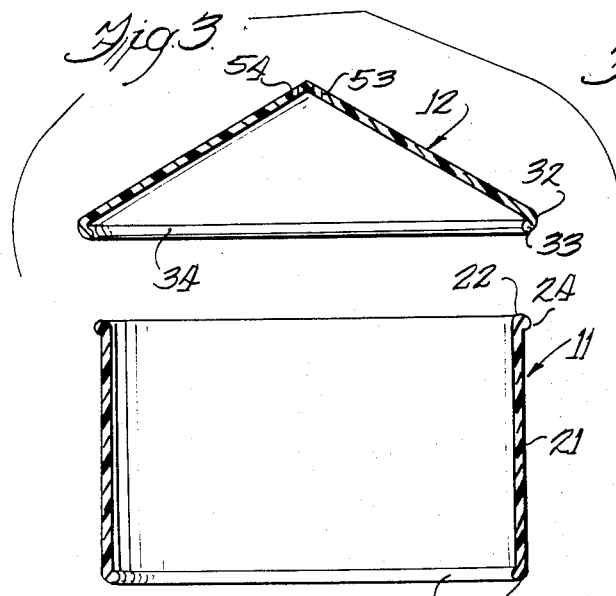
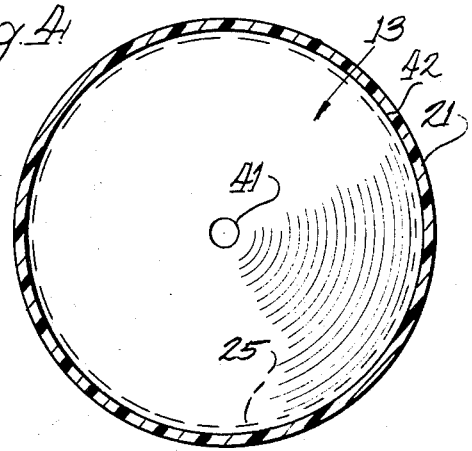
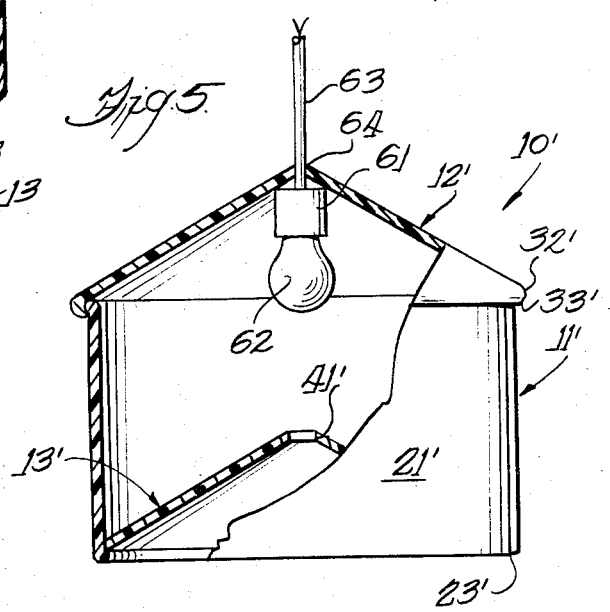

FLY AND INSECT TRAP

BACKGROUND OF THE INVENTION

1. Field of the Invention

This invention relates generally to insect traps and more particularly to a novel and improved combination fly and insect trap for catching flies and other insects in an efficient manner.

2. Description of the Prior Art

There have long been in use traps of different types for the catching of flies, insects, and the like requiring the use of water or other solutions for drowning the flies and insects once caught in the trap, these traps requiring that such water be replaced at frequent intervals due to loss by evaporation and the like, along with the associated messy condition when having to clean the water from the trap and having the dead flies and insects floating therein.

Further, such prior art traps required extensive assembly and disassembly procedures each time the trap was to be cleaned, the bait replaced, or the like, such that most individuals would soon either discard the trap or fail to properly maintain the same so that the trap would no longer be effective to attract and trap flies and insects.

Other fly and insect traps in the prior art utilized electrical current or the like to electrocute insects once caught therein, but such traps provide a hazardous situation for other animals and especially to young children who would be drawn to such a device out of curiosity and child-like interest.

Prior art devices thus suffer many problems and dificulties in attempting to provide a satisfactory fly and insect trap.

SUMMARY OF THE INVENTION

The present invention remedies and overcomes all of the foregoing deficiencies and disadvantages of presently available fly and insect traps by providing a novel trap structure serving to attract flies and insects thereinto and then trapping the same for later disposal.

It is a feature of the present invention to provide a fly and insect trap for catching flies and other insects with a high degree of efficiency and with the components of the trap readily dismantleable and separable from each other so that the trap may be cleaned and maintained with a minimum of effort.

A further feature of the present invention provides a fly and insect trap intended to be baited with a sweet smelling substance or the like to attract the flies and insects into the trap from which they will not be able to escape.

A further feature of the present invention provides a fly and insect trap having an electric light disposed therein which serves to attract the flies and insects into the trap in a well known manner from which they are unable to escape.

Still a further feature of the present invention provides a fly and insect trap requiring little maintenance and which acts to attract the flies and insects to their death.

The provision of a fly and insect trap, such as briefly outlined above, and possessing the stated advantages, constitutes the principal features of the present invention. The provision of a fly and insect trap which is relatively simple in its construction and which therefore may be readily manufactured at a relatively low cost and by simple manufacturing methods; one which is devoid of moving parts and which therefore is unlikely to get out of order; one which is rugged and durable and which therefore may be guaranteed by the manufacturer to withstand many years of intended usage; one which is aesthetically pleasing and refined in appearance; one which operates with a high degree of efficiency in the trapping of winged insects and the like; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a fly and insect trap constructed in accordance with the present invention;

FIG. 2 is a front elevational cross-sectional view taken along a vertical plane passing substantially through the center of the trap;

FIG. 3 is an exploded front elevational cross-sectional view of the trap;

FIG. 4 is a cross-sectional view taken along line 4—4 of FIG. 2; and

FIG. 5 is a front elevational view of a modified form of the invention partially broken away to disclose the interior trap chamber thereof.

DESCRIPTION OF THE PREFERRED EMBODIMENT

Referring now to the drawings in detail and in particular to FIGS. 1 to 4 inclusive, a preferred form of a fly and insect trap embodying the invention is designated in its entirety by the reference numeral 10 and is comprised of three component parts, namely a cylindrical body 11, a conical shaped cover 12, and a conical shaped bottom 13 which define therebetween a trap compartment 14 having a bait 15 suspended therein. The trap 10 may be manufactured out of metal, wood, rubber, plastic, or any other suitable satisfactory material providing an aesthetically pleasing and refined appearance. In the preferred embodiment, the cover 12 is of a light transmitting translucent material with the body 11 also being of a light transmitting translucent material which may have the same translucency as the cover material or may have a lesser translucency. The bottom 13 is preferably manufactured out of a dark material having light blocking characteristics so that no light passes through such material.

The body 11 is of an elongated hollow open ended cylinder in shape having a cylindrical side wall 21 and being open at the top end edge 22 and the bottom end edge 23. Formed integrally with the top edge 22 is an outwardly extending radially projecting rim formed circumferally about the top edge and defining an annular ridge 24. Formed integrally with the bottom edge 23 of the side wall 21 is a radially inwardly directed projection defining an annular shoulder 25 extending inwardly about the interior of the side wall.

The cover 12 is of a conically shaped resilient material having an apex 31 and a lower peripheral circular edge 32 which is provided with an integrally formed radially inwardly rolled lip portion 33 defining an annular groove 34 circumferentially about the interior surface of the cover adjacent the peripheral edge thereof, the groove being of a size and depth adapted to engage therein ridge 24 in a manner to removably secure the cover 12 to the body 11. The normal diameter of the circular edge 32 is less than the exterior diameter of the body 11 such that to attach the cover 12 to the body the cover is axially aligned with the body axis and then pressed inwardly relative to the body, engaging the lip 33 onto the ridge 24, and with continued inward directed movement on the cover effecting the radial expansion of the diameter of the edge 32 such that the lip rolls over the body ridge to engage the ridge 24 in the groove 34.

The bottom 13 is of a conically shaped resilient material adapted to be readily attached to and detached from the body 11, the bottom having an aperture 41 extending through the apex portion thereof and a lower peripheral circular edge 42 having a diameter approximately equal to or slightly greater than the interior diameter of the body 11. The bottom 13 is adapted to be attached to the body 11 by being axially aligned therewith and then forced inwardly thereof relative to the bottom edge 23 until peripheral edge 42 is disposed inwardly of the body 11 in a position resting on shoulder 25 in a manner to close the body bottom open end except for the aperture 41 extending therethrough. The aperture 41 is of a size and configuration adapted to permit flies, insects, and other like winged pests to pass therethrough into the trap chamber 14, such being attracted by the bait 15 which is suspended in the trap chamber by a hook 51 connected to the cover 12 approximately centrally thereof by use of a ring 52 passing through apertures 53 and 54 disposed at diametrically opposed positions adjacent the apex 31. To support the trap 10 in a desired location there is provided a chain 55 or the like having one end connected to the ring 52 with the opposite end projecting freely therefrom to be attached to the suitable support for hanging the trap in the desired location.

In operation, flies or other flying insects are attracted through aperture 41 by the bait 15, and after entering the trap chamber 14 to feed on the bait, they then tend to fly upwards to leave the bait thus encountering the cover 12 and body 11 through which light projects due to their translucent material characteristics. Upon striking the inner surfaces of the cover and side walls, and by continued efforts to leave the trap, they soon become fatigued and fall back into the annular trough defined between the interior surface of the bottom 13 and the adjacent interior surface of the side wall 21, where eventually they die due to the poison of the bait or due to natural causes since they cannot find their way back out through aperture 41 as any efforts they make to leave the trap will be directed to the translucent cover and side walls since the insects see the light passing therethrough.

For purposes of maintenance and cleanability, it is to be noted that the cover 12 and bottom 13 are readily separated from the body 11 in a simple and efficient manner requiring no special skills, tools or expertise by the individual using the trap, with cleaning being accomplished in a clean manner avoiding messy conditions as no water or other solutions are required in the trap to accomplish the killing of the flies and insects trapped therein.

Referring now to FIG. 5, there is disclosed a modified form of the invention wherein, due to the similarity between parts of the aforedescribed invention and parts of the modification of FIG. 5, similar reference numerals having a prime mark applied thereafter have been utilized to identify the corresponding parts as between the disclosures of FIGS. 1–4 and the disclosure of FIG. 5. The modification of FIG. 5 is substantially identical to the trap as previously described except that in place of the bait 15 and the associated hook 51 and chain 55 there is provided an electric lamp socket 61 having an electric lamp 62 operatively connected thereto, with the lamp socket having an electric cord 63 which passes out of the cover 12' through an opening 64 provided in the apex thereof, the cord 63 adapted to be connected to a suitable power source and also adapted to be utilized in the suspending of the trap 10' from a suitable support surface, the light rays of the lamp showing through the translucent cover 12' and body 11' and also through the aperture 41' in the bottom 13' so as to attract winged insects thereto in a well known manner, such insects lighting on the trap and eventually finding their way into the trap chamber 14' through aperture 41', after which the insects cannot find their way out of the trap and thus die therein.

There is thus provided a novel fly and insect trap having a high degree of efficiency, of a pleasing appearance, and of which the parts thereof are readily separable so that the trap may be dismantled for cleaning or maintenance and then readily reassembled for usage without requiring special tools, skills, or expertise on the part of the individual, and without requiring any messy solutions or the like to be retained in the trap for the proper operation thereof.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A fly and insect trap comprising an elongated hollow open ended cylindrical body having an open top end, and open bottom end, and a cylindrical side wall, the top edges of the side wall having an integrally formed outwardly extending radial projection formed circumferally thereabout defining an annular ridge, the botom edges of the side wall having an integrally formed radially inwardly directed projection defining an annular shoulder extending inwardly about the interior of the side wall; a conically shaped resilient cover for the top end of the body adapted to be readily attached to and detached from the body, the apex of the cover disposed approximately centrally of the body and projecting axially outwardly from the body, the lower peripheral circular edge of the cover being provided with an integrally formed radially inwardly rolled lip portion defining an annular groove circumferally about the interior cover surface adjacent the peripheral edge adapted to be detachably connected to the body ridge to removably secure the cover to the body; a conically shaped resilient bottom for the bottom end of the body adapted to be readily attached to and detached from the body, the apex of the bottom disposed approximately centrally of the body and projecting axially inwardly of the body, the apex having an aperture extending therethrough of a size and configuration adapted to permit winged insects, flies, and the like to pass therethrough, the lower peripheral circular edge of the bottom adapted to fit within the body and rest on the body shoulder in a manner to close the body bottom open end; the interior of the cover together with the interior of the side walls together with the interior of the bottom defining a trap chamber; means for suspending the trap from a suitable supporting surface; and means associated with the interior of the trap chamber adapted to attract flies and insects into the trap chamber.

2. The fly and insect trap as set forth in claim 1 wherein the cover is manufactured of a translucent material, and wherein the body is manufactured of a translucent material.

3. The fly and insect trap as set forth in claim 2 wherein the means to support the trap is comprised of a circular ring suitably connected to the cover about the apex thereof and projecting exteriorly thereof, and an elongated flexible chain like means having one end connected to the ring with the opposite end extending freely therefrom adapted to be attached to a suitable supporting surface; and wherein the means to attract the flies and insects into the trap chamber is comprised of a hook like means having one end connected to the support ring interior of the apex of the cover with the opposite end of the hook adapted to support thereon the poisoned bait and the like in a manner suspended within the trap chamber.

4. The fly and insect trap as set forth in claim 2 wherein the means to attract the insects to the trap along with the means to support the trap from a suitable surface are comprised of an electric lamp socket disposed in the trap chamber adjacent the interior surface of the cover about the apex portion thereof and adapted to receive an electric light bulb in an operable manner therein, and an electric cord having one end attached to the lamp socket with the opposite end passing freely through an opening disposed in the apex of the cover and adapted to suspend the trap from a suitable supporting surface and also adapted to be connected to a suitable power source for energization of the electric light bulb in the trap.

5. The fly and insect trap as set forth in claim 3 wherein the bottom is of a dark light blocking non-reflecting material preventing any light from passing therethrough except that which passes through the aperture providing the entrance into the trap chamber.

6. The fly and insect trap as set forth in claim 4 wherein the bottom is of a dark light blocking non-reflecting material preventing any light from passing therethrough except that which passes through the aperture providing the entrance into the trap chamber.

7. The fly and insect trap as set forth in claim 5 wherein the cover, body and bottom are all manufactured of a plastic material.

8. The fly and insect trap as set forth in claim 6 wherein the cover, body and bottom are all manufactured of a plastic material.

* * * * *